(12) United States Patent
Arbjerg

(10) Patent No.: US 8,561,643 B2
(45) Date of Patent: Oct. 22, 2013

(54) CONTROL DEVICE FOR A HYDROSTATIC STEERING MOTOR

(75) Inventor: Niels Arbjerg, Sydals (DK)

(73) Assignee: Sauer-Danfoss Aps, Nordborg (DK)

( * ) Notice: Subject to any disclaimer, the term of this patent is extended or adjusted under 35 U.S.C. 154(b) by 180 days.

(21) Appl. No.: 13/281,739

(22) Filed: Oct. 26, 2011

(65) Prior Publication Data

US 2012/0103444 A1 May 3, 2012

(30) Foreign Application Priority Data

Nov. 3, 2010 (DE) .......................... 10 2010 050 137

(51) Int. Cl.
*B62D 5/083* (2006.01)

(52) U.S. Cl.
USPC ........................... 137/625.24; 60/384; 60/387

(58) Field of Classification Search
USPC ............................... 137/625.24; 60/384, 387
See application file for complete search history.

(56) References Cited

U.S. PATENT DOCUMENTS

| | | | |
|---|---|---|---|
| 3,819,307 A * | 6/1974 | Uppal | .......................... 418/61.3 |
| 4,730,544 A | 3/1988 | Jorgensen | |
| 7,610,935 B2 * | 11/2009 | Arbjerg | .................... 137/625.24 |

FOREIGN PATENT DOCUMENTS

DE          42 04 336 A1     8/1993

\* cited by examiner

*Primary Examiner* — John Rivell
*Assistant Examiner* — R. K. Arundale
(74) *Attorney, Agent, or Firm* — McCormick, Paulding & Huber LLP

(57) ABSTRACT

A control device (1) for a hydrostatic steering motor comprises supply and return pump and tank connections (P, T), a slide valve arrangement in which inner and outer slide element sleeves are rotatable relative to each other to both sides of a neutral position through a limited small angle, said sleeves mutually forming controlled supply and return passages connected to said motor having supply and return throttles which are closed when said sleeves are in a neutral position, bypass throttle means (7) between said pump and tank connections (P, T) being open when said sleeves are in a neutral position, said bypass throttle means (7) having a set of at least two variable orifices connected in series. In such a device the noise should be reduced when a higher supply pressure of hydraulic fluid is used.

10 Claims, 3 Drawing Sheets

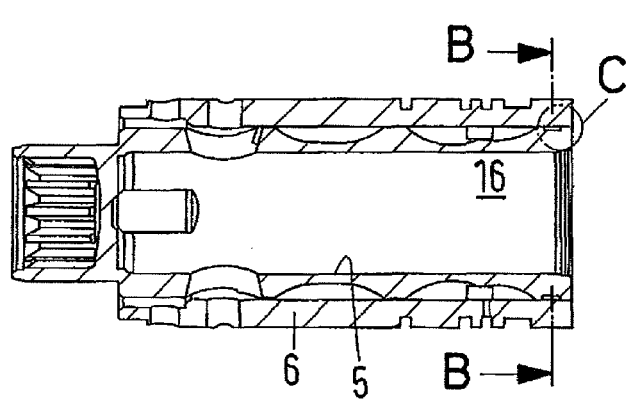
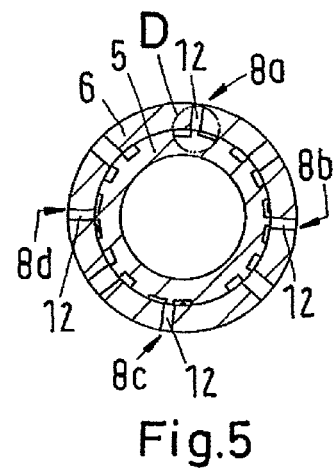
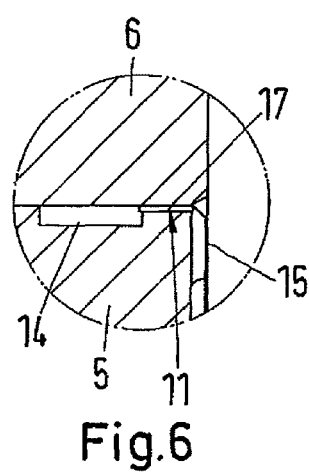
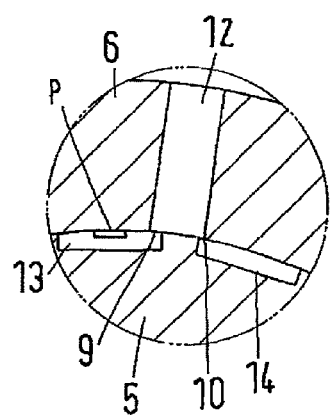

CONTROL DEVICE FOR A HYDROSTATIC STEERING MOTOR

CROSS REFERENCE TO RELATED APPLICATION

Applicant hereby claims foreign priority benefits under U.S.C. §119 from German Patent Application No. 10 2010 050 137.9 filed on Nov. 3, 2010, the contents of which are incorporated by reference herein.

FIELD OF THE INVENTION

The invention relates to a control device for a hydrostatic steering motor, said device comprising supply and return pump and tank connections, a slide valve arrangement in which inner and outer slide element sleeves are rotatable relative to each other to both sides of a neutral position through a limited small angle, said sleeves mutually forming control supply and return passages connected to said motor having supply and return throttles which are closed when said sleeves are in a neutral position, bypass throttle means between said pump and tank connections being open when said sleeves are in a neutral position, said bypass throttle means having a set of at least two variable orifices connected in series.

BACKGROUND OF THE INVENTION

Such a control device is known from U.S. Pat. No. 4,730,544. The two variable orifices are formed by an oblique blind bore formed in the radially inner surface of the outer sleeve and overlapping two grooves running axially in the radial outer surface of the inner sleeve.

Such a design allows a flow of hydraulic fluid through the control device even when the two sleeves are in a neutral position relative to each other. The device can be kept at approximately the same temperature as the hydraulic fluid to avoid thermal shock which could appear at a too high temperature difference between the control device and hydraulic oil entering the control device.

The device according to U.S. Pat. No. 4,730,544 operates satisfactorily when the standby pressure of the hydraulic oil is not too large, e.g. 8 bar only. However, in some case there is a demand for a higher standby pressure of the hydraulic fluid. In this case a noise appears which is in many cases not acceptable.

SUMMARY OF THE INVENTION

The task underlying the invention is to reduce noise when a higher supply pressure of the hydraulic fluid is used.

This task is solved in that said set of at least two variable orifices is connected in series with a fixed orifice.

The at least two variable orifices change the flow resistance when the two sleeves are rotated relative to each other. In the neutral position they are fully open. When the two sleeves are rotated relative to each other by a predetermined angle, one of the two sleeves is completely closed. The fixed orifice which is arranged in series with the at least two orifices of the set creates an additional flow resistance which dampens noise in the set of sleeves.

In a preferred embodiment the fixed orifice is arranged between the set of at least two orifices and said tank connection. In this case the fixed orifice creates a higher pressure at the outlet of the second variable orifice, i.e. the variable orifice which is connected to the fixed orifice. The higher the pressure at the outlet of a variable orifice, the lower the noise produced in said orifice.

It is advantageous that at least two sets of at least two variable orifices connected in series with a fixed orifice are arranged parallel to each other. The fixed orifice has the advantage of dampening the noise. However, it limits the flow of hydraulic fluid through the control device when the two sleeves are in the neutral position. In order to keep a sufficient amount of hydraulic fluid flowing through the control device at least two sets of orifices are provided. With two sets of orifices the flow is doubled compared with only one set of orifices. In a preferred embodiment four sets of orifices are used.

Preferably the at least two sets are arranged at a distance to each other in a circumferential direction of the sleeves. In this case it is preferred that the sets of orifices have approximately the same distance relative to each other in the circumferential direction. The hydraulic fluid passing through the control device is distributed uniformly around the sleeves so that the temperature in the sleeves and in the housing can be kept even.

In a preferred embodiment upon rotation of said two sleeves relative to each other at least one set of orifices is closed earlier than another set of orifices. This means that not all sets of orifices are closed at the same steering angle. In this case it is relatively simple to get a smooth closing of the bypass throttle means.

In this case, it is preferred that a set of orifices closing first upon rotation of the two sleeves relative to each other in one direction differs from a set of orifices closing first upon rotation of the two sleeves relative to each other in the opposite direction. In other words, it depends on the steering direction which set of orifices closes first. The noise which is created by the hydraulic fluid passing through the bypass throttle means is also dependent on the steering direction. This noise can be compensated for by off-setting the closing angle of different sets of orifices relative to each other.

Preferably, the variable orifices of each set are located at a predetermined distance from a front face of the inner sleeve and the fixed orifice opens into said front face. The predetermined distance gives a sufficient sealing area so that the hydraulic fluid passing through the two variable orifices cannot escape via other flow paths. The fixed orifice has to open into a space which is connected to the tank. This is accomplished in a simple manner by leading the hydraulic fluid just into the interior of the inner sleeve which has a connection to the front face of the inner sleeve.

Preferably, the fixed orifice has a section, said section having a height which is smaller than its width. The height should be sufficient to allow particles to pass in order to avoid clogging of the fixed orifice. However, the height should be so small that a flow having a small Reynold's number is created which in turn gives a relatively low noise. The section necessary to ensure a sufficient flow of hydraulic fluid is secured by the width of the fixed orifice.

Preferably, for each variable orifice the inner sleeve comprises a chamber in its radial outer surface that partly overlaps a bore opening in the radial inner surface of the outer sleeve in a neutral position of the two sleeves. In principle the chamber can have any shape. However, when a drill is used to form the chamber, the chamber has a circular or cylindrical shape. The volume of said chamber can be made larger than the volume of a simple groove or slit as in the prior art. In this case it is preferred that the volume of at least the chamber of the variable orifice connected to the fixed orifice is large enough to dampen turbulences of hydraulic fluid passing through that variable orifice before reaching the fixed orifice. In particular, in a situation shortly before the complete closing of the variable orifice which is connected to the fixed orifice a sharp jet of hydraulic fluid is directed into the chamber. When the volume of the chamber is large enough, this jet of hydraulic fluid is dampened, so that unwanted turbulences of the hydraulic fluid do not reach the fixed orifice. This is an additional measure to keep the noise low.

BRIEF DESCRIPTION OF THE DRAWINGS

A preferred example of the invention will now be described in more detail with reference to the drawing, wherein:

FIG. 4 is a longitudinal section through a set of sleeves, FIG. 5 is a section on line B-B in FIG. 4, FIG. 6 is a detail C of FIG. 4, FIG. 7 is a detail D of FIG. 5.

DETAILED DESCRIPTION OF THE PREFERRED EMBODIMENTS

Figure 1:
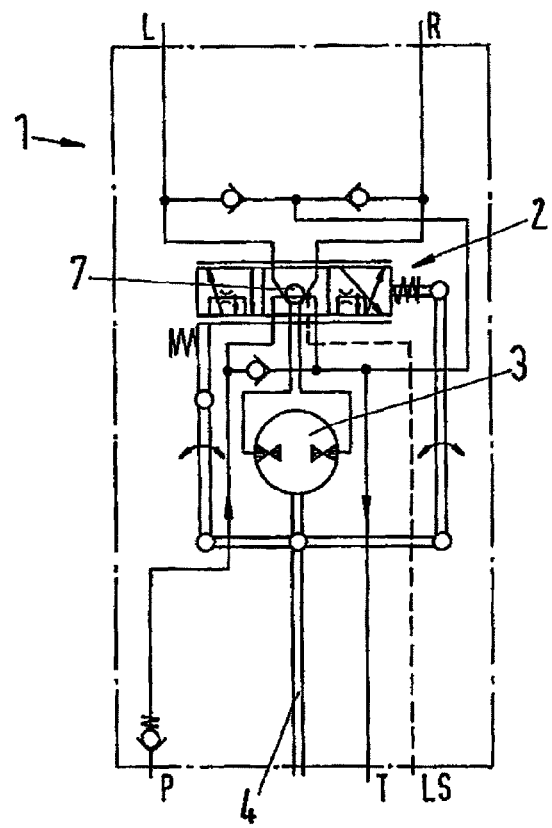
FIG. 1 is a diagrammatic representation of a control device according to the present invention.

FIG. 1 shows schematically a control device 1 for a hydrostatic steering motor comprising a supply connection P, a tank connection T, a load sensing connection LS, a first working connection L and a second working connection R. The control device 1 comprises a direction valve 2 and a metering motor 3. The direction valve 2 is formed by a set of sleeves shown in FIG. 4 and a housing (not shown in the drawing). The design of such a control device is known per se, e.g. sold by Sauer-Danfoss NS, Nordborg, Denmark, under OSPC, OSPF or OSPB. A more detailed description can be found in U.S. Pat. No. 4,730,544, which is incorporated here by reference.

A steering shaft 4 which can be connected to a steering wheel (not shown) is connected to the direction valve 2 and operates to rotate an inner sleeve 5 (FIG. 4) out of a neutral position relative to an outer sleeve 6. This rotation opens a flow path through which hydraulic fluid (in the following briefly: oil) can flow from the pump connection P through the steering valve to the metering motor 3. Oil flowing back from the metering motor 3 to the direction valve 2 passes to one of the working connections L, R depending on the direction of rotation of the inner sleeve 5 relative to the outer sleeve 6. The metering motor 3 is connected to the outer sleeve 6 and rotates the outer sleeve 6 relatively to the inner sleeve 5 until the neutral position between the two sleeves 5, 6 is reached.

In a neutral position the flow path from the pressure connection P to one of the two working connections L, R is completely closed. Furthermore, a flow path from the other of the two working connections L, R to the tank connection T is closed as well.

Figure 2:
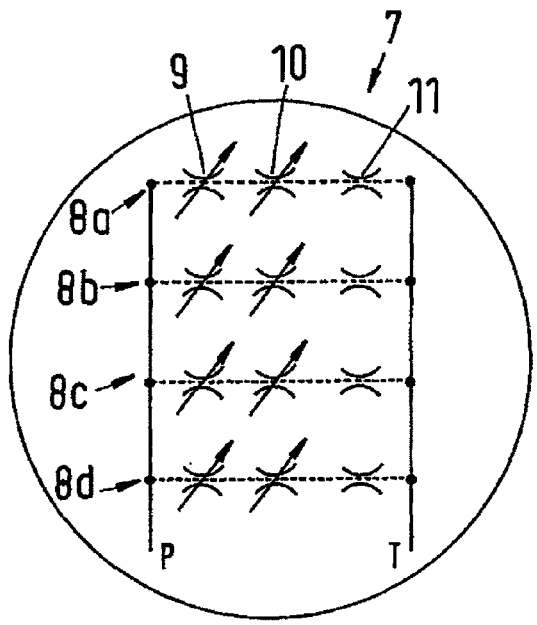
FIG. 2 is an enlarged schematic representation of a bypass throttle means between pump connection and tank connection in a neutral position of the control device.
Figure 3:
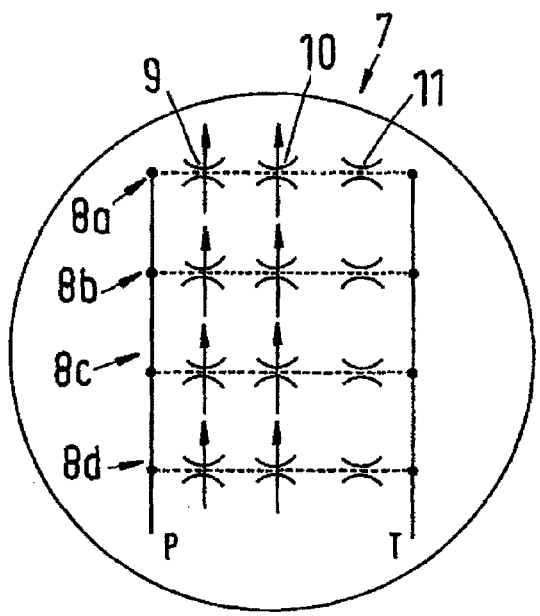
FIG. 3 is the view according to FIG. 2 out of neutral position of the control device.

In order to establish a flow through the control device 1 in the neutral position, a bypass throttle means 7 is arranged between the pump connection P and the tank connection T. This bypass throttle means 7 is part of the direction valve 2 and shown in further details in FIGS. 2 and 3. It is open in the neutral position (no steering) and closed out of the neutral position (steering).

The bypass throttle means 7 comprises four sets 8a, 8b, 8c, 8d of orifices. However, any other number greater than one is usable. Each set 8a, 8b, 8c, 8d of orifices comprises a first variable orifice 9, a second variable orifice 10 and a fixed orifice 11. These three orifices 9-11 are connected in series between the pump connection P and the tank connection T. The four sets 8a, 8b, 8c, 8d of orifices are arranged in parallel between the pump connection P and the tank connection T.

In the neutral position (FIG. 2) the two variable orifices 9, 10 are open. In the position out of neutral (FIG. 3) the series connection of the variable orifices 9, 10 is completely closed. To this end it is sufficient that only one of the two variable orifices 9, 10 of each set 8a, 8b, 8c, 8d is closed. Nevertheless therefore, in FIG. 3 both variable orifices 9, 10 are shown with a vertical arrow representing a closed set 8a, 8b, 8c, 8d. The fixed orifice 11 of each set 8a, 8b, 8c, 8d of orifices remains open all the time.

Design details of the way to form the variable orifices 9, 10 and the fixed orifice 11 are shown in FIGS. 4 to 7.

The outer sleeve 6 has (for each set of orifices 8a, 8b, 8c, 8d) a bore 12 which is on the radially outer side covered by the housing (not shown). In the neutral position this bore 12 overlaps a first chamber 13 and a second chamber 14. Said two chambers 13, 14 are formed in the radially outer surface or side of the inner sleeve 5.

In the neutral position the bore 12 partly overlaps said first chamber 13. A gap connecting the first chamber 13 and the bore 12 forms the first variable orifice 9. In the neutral position the bore 12 furthermore partly overlaps said second chamber 14. A gap through which the bore 12 and the second chamber 14 are connected forms the second variable orifice 10. The widths of the gaps change when the two sleeves 5, 6 are rotated relative to each other.

The first chamber 13 is connected to the pump connection P. The second chamber 14 is connected to the fixed orifice 11. The fixed orifice 11 opens into a front face 14 of the inner sleeve 5 so that oil escaping via the fixed orifice 11 can pass to the interior 16 of the inner sleeve 5. Said interior 16 is connected to the tank connection T.

Figure 8:
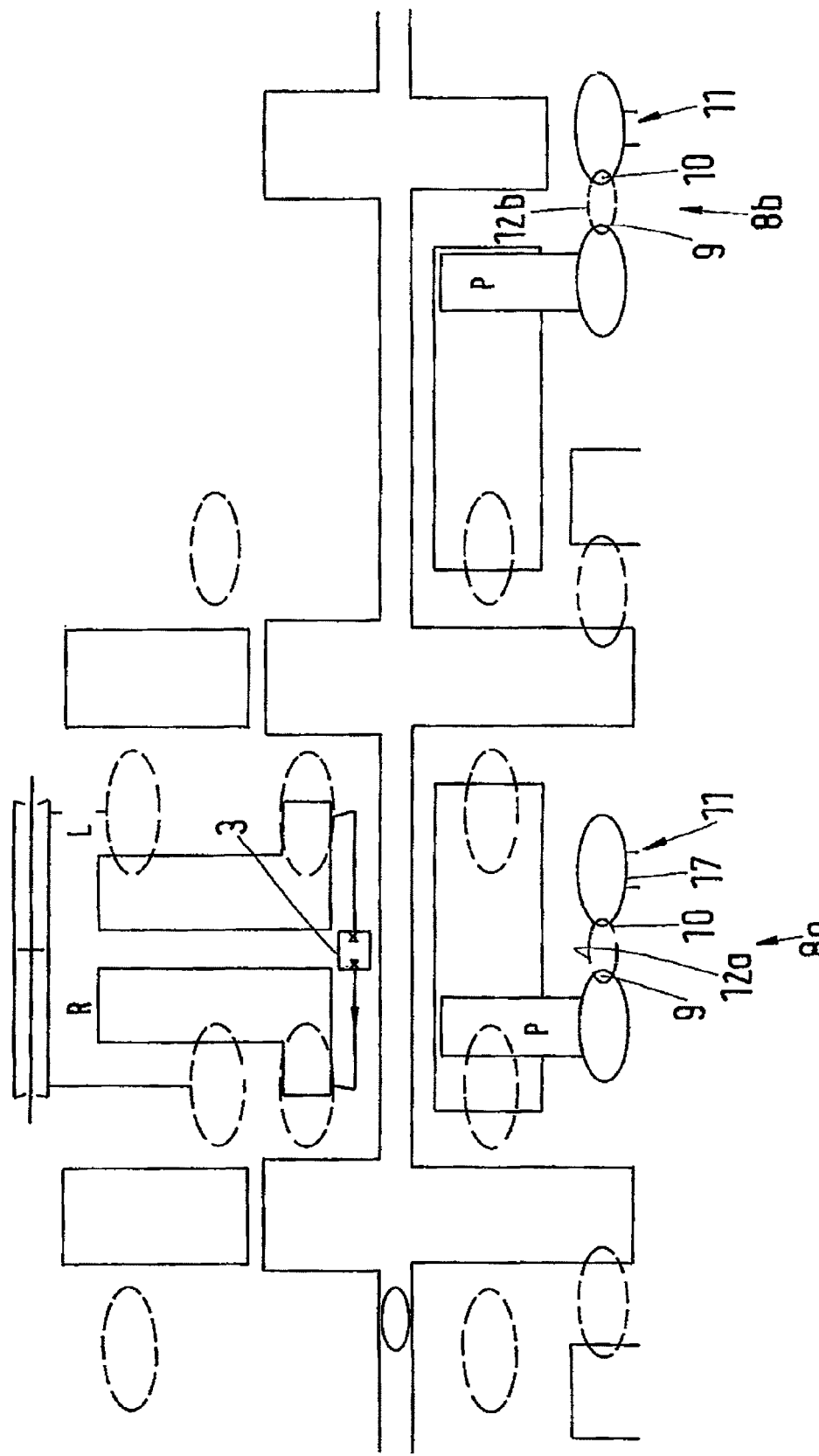
FIG. 8 is a development of a part of a set of sleeves in the circumferential direction.

The fixed orifice 11 which is also shown in FIG. 8 is formed by a groove 17 extending axially on the radially outer surface or side of the inner sleeve 5. This groove is covered by the outer sleeve 6. The groove has a height which is sufficient to allow the passage of particles which are in some cases contained in the oil. Apart from this condition the height of the groove 17 should be as small as possible in order to produce a low noise level. The section which is necessary to allow sufficient oil to pass through the fixed orifice 11 is secured by the width of the groove 17 which is larger than the height of the groove 17. A sufficient flow of oil is possible because of the four sets 8a, 8b, 8c, 8d which are arranged in parallel.

The volume of at least the second chamber 14 is rather big. The reason is that when the two sleeves 5, 6 move relatively to each other and close the second variable orifice 10, a sharp jet of oil is directed into the second chamber 14 causing turbulences. These turbulences should be dampened before the oil reaches the fixed orifice 11 in order to avoid the generation of unwanted noise. The two chambers 13, 14 can be formed by drilling a blind bore into the radially outer surface of the inner sleeve 5.

The fixed orifice 11 is arranged between the second variable orifice 10 and the tank connection T. This has the effect that the pressure behind the second variable orifice 10 can be kept relatively high. The noise which is created at a variable orifice 9, 10 depends on the pressure behind the variable orifice 9, 10. In many cases it can be observed that the higher this pressure is, the lower is the noise.

The two sleeves 5, 6 form a total of four sets 8a, 8b, 8c, 8d of orifices. As can be seen in FIG. 5 these four sets 8a, 8b, 8c, 8d are distributed in the circumferential direction over the two sleeves 5, 6. The distances between two sets 8a, 8b; 8b, 8c; 8c, 8d; 8d, 8a of orifices are almost equal. This allows a sufficiently uniform distribution of the oil passing through the control device 1 in the neutral position of the two sleeves 5, 6.

FIG. 8 shows a development of the circumferential surface of the two sleeves over a part of their circumference. The dotted lines show bores formed in the outer sleeve 6. The elements shown with full lines are part of the inner sleeve 5.

The inner sleeve 5 has been rotated relatively to the outer sleeve 6 to the right (this direction refers to the illustration of FIG. 8). It can be seen that a set 8a of orifices 9, 10 is almost closed since the second variable orifice 10 is almost closed whereas in a set 8b the passage from the pump connection P to the fixed orifice 11 is still open since both variable orifices 9, 10 remain open. In other words, the variable orifices of different sets 8a, 8b, 8c, 8d of orifices do not close at the same angle of rotation of the inner sleeve 5 relative to the outer sleeve 6. The bypass throttle means formed between the pump connection P and the tank connection T is therefore not suddenly interrupted thus allowing a smooth closing.

To realise this offset of the different sets 8a, 8b, 8c, 8d of orifices the bore 12 (which is named bore 12a for the set 8a and bore 12b for the set 8b) can be arranged with slightly different distances relative to each other in the circumferential direction.

One set out of the sets 8a, 8b, 8c, 8d of orifices closes first when the two sleeves 5, 6 are rotated relatively to each other. When for example the inner sleeve 5 is rotated in the clockwise direction relatively to the outer sleeve 6 the set 8a of orifices closes first. When the inner sleeve 5 is rotated in the counterclockwise direction relatively to the outer sleeve 6 another set 8c of orifices closes first. Therefore, the set 8a, 8b, 8c, 8d closing first depends on the direction of rotation which is an additional feature to ensure minimum flow noise.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A control device for a hydrostatic steering motor, said device comprising supply and return pump and tank connection, a slide valve arrangement in which inner and outer slide element sleeves are rotatable relative to each other to both sides of a neutral position through a limited small angle, said sleeves mutually forming controlled supply and return passages connected to said motor having supply and return throttles which are closed when said sleeves are in a neutral position, bypass throttle means between said pump and tank connections (P, T) being open when said sleeves are in a neutral position, said bypass throttle means having a set of at least two variable orifices connected in series, wherein said set of at least two variable orifices is connected in series with a fixed orifice.

2. The device according to claim 1, wherein the fixed orifice is arranged between the set of at least two variable orifices and said tank connection (T).

3. The device according to claim 1, wherein at least two sets of at least two variable orifices connected in series with a fixed orifice are arranged parallel to each other.

4. The device according to claim 3, wherein the at least two sets are arranged spaced at a distance to each other in circumferential direction of the sleeves.

5. The device according to claim 3, wherein upon rotation of said two sleeves relative to each other at least one set of orifices is closed earlier than another set of orifices.

6. The device according to claim 5, wherein a set of orifices closing first upon rotation of the two sleeves relative to each other in one direction differs from a set of orifices closing first upon rotation of the two sleeves relative to each other in the opposite direction.

7. The device according to claim 1, wherein the variable orifices of each set are located at a predetermined distance from a front face of the inner sleeve and the fixed orifice opens into said front face.

8. The device according to claim 7, wherein the fixed orifice has a section, said section having a height which is smaller than its width.

9. The device according to claim 1, wherein for each variable orifice the inner sleeve comprises a chamber in its radial outer surface that partly overlaps a bore opening in the radial inner surface of the outer sleeve in a neutral position of the two sleeves.

10. The device according to claim 9, wherein the volume of at least the chamber of the variable orifice connected to the fixed orifice is large enough to dampen turbulences of hydraulic fluid passing through said variable orifice before reaching the fixed orifice.

* * * * *